Feb. 25, 1936.　　　　A. A. HOCHER ET AL　　　　2,032,017
SHEET METAL INSULATOR SUPPORT PIN AND METHOD OF MAKING THE SAME
Filed Dec. 16, 1935　　　2 Sheets-Sheet 1
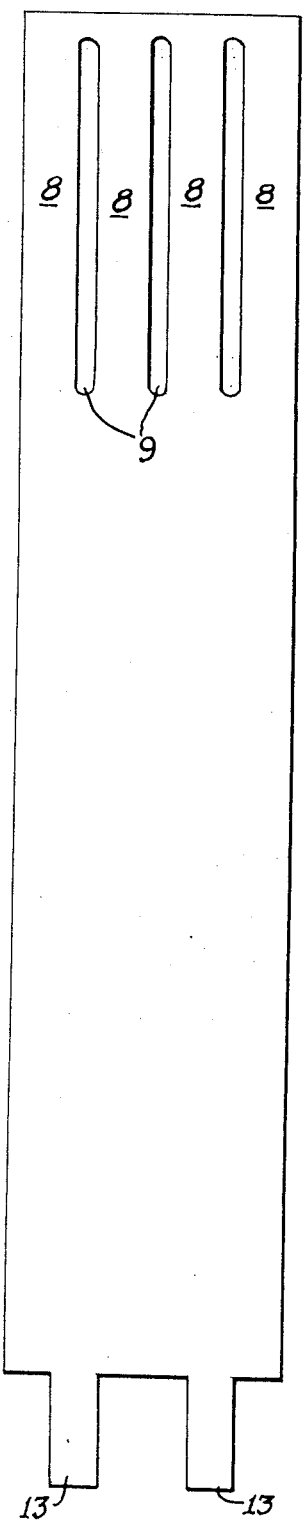
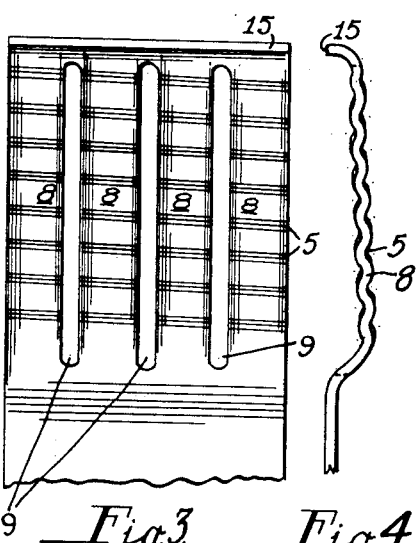
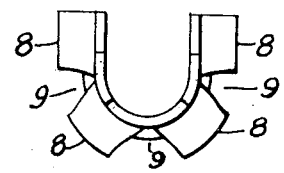
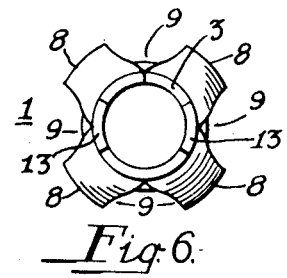
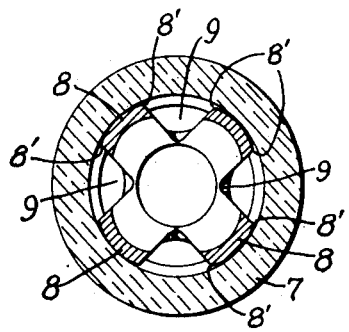
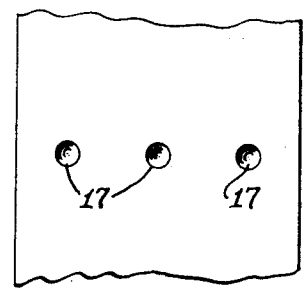
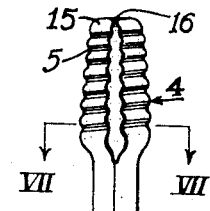
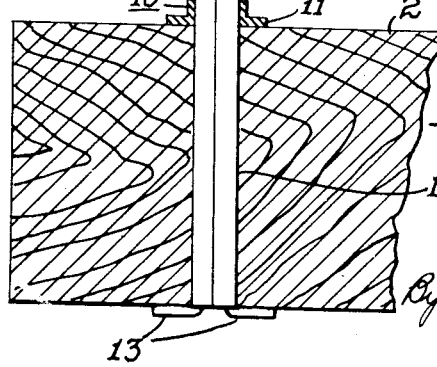
INVENTORS
Andrew A. Hocher and
Marshall Lasher
By Green & McCallister
Their Attorneys Feb. 25, 1936.   A. A. HOCHER ET AL   2,032,017
SHEET METAL INSULATOR SUPPORT PIN AND METHOD OF MAKING THE SAME
Filed Dec. 16, 1935   2 Sheets-Sheet 2
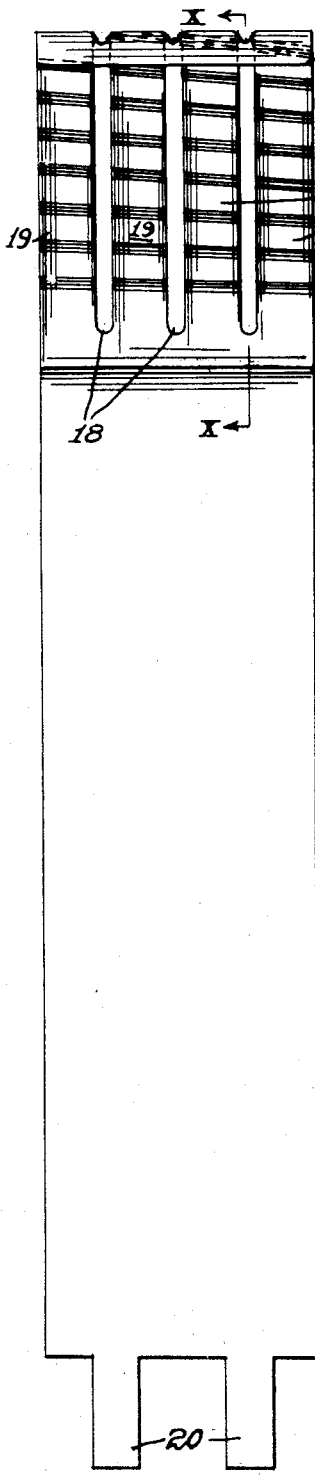
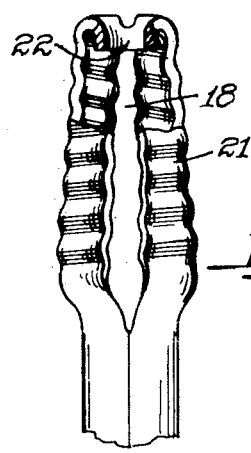
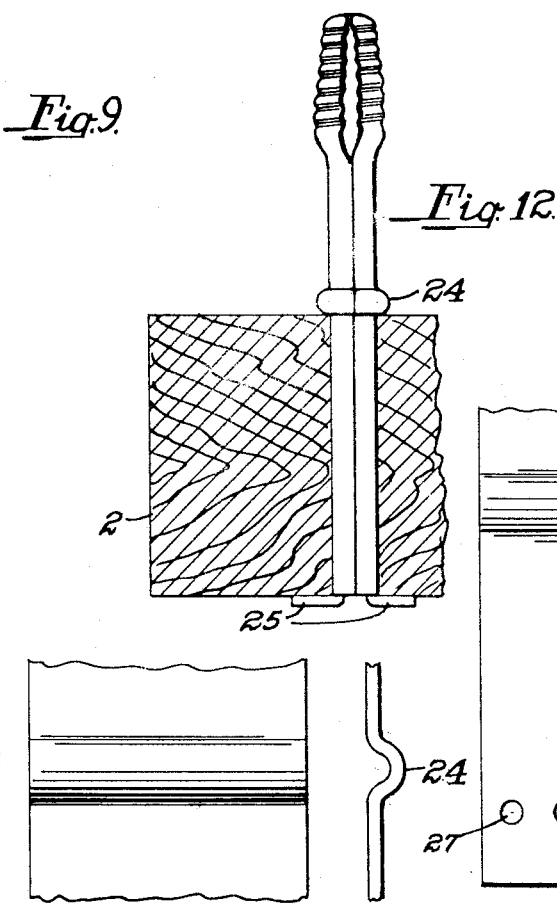
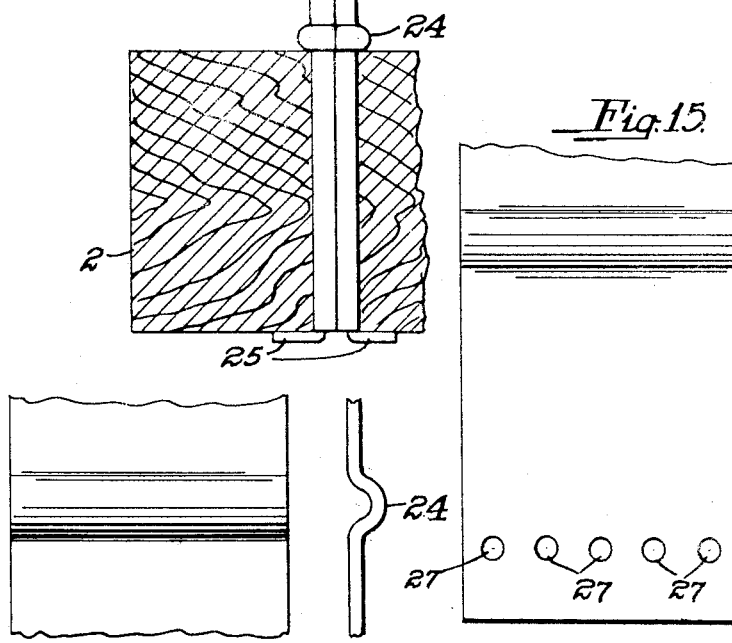
INVENTORS
Andrew A. Hocher and
Marshall Lasher
By Green & McCallister
Their Attorneys Patented Feb. 25, 1936

2,032,017

UNITED STATES PATENT OFFICE 2,032,017

SHEET METAL INSULATOR SUPPORT PIN
AND METHOD OF MAKING THE SAME

Andrew A. Hocher, Etna, and Marshall Lasher, Pittsburgh, Pa., assignors to Hubbard and Company, a corporation of Pennsylvania Application December 16, 1935, Serial No. 54,770

23 Claims. (Cl. 29—155.52)

This invention relates to insulator support pins and more particularly to all sheet metal pins and to methods of making the same.

An object of this invention is to provide an all sheet metal insulator support pin for use with screw-on type insulators, which shall comprise a unitary resilient thimble and shank.

Another object of this invention is to provide an all sheet metal insulator support pin that shall be stronger than wood pins, require smaller cross arm holes, and be comparable to wood pins in cost.

A further object of this invention is to provide an all sheet metal pin having unitary thimble and shank, but characterized by the fact that the thimble is of resilient yieldable construction and tapered, and that the diameter of the thimble at its base is greater than the diameter of the shank.

A still further object of the invention is to provide a method of making an all sheet metal pin of the character set forth above, and in particular a procedure by which it is possible to make all sheet metal pins from a sheet metal blank having the same gauge throughout and from a blank which is of the same width throughout its full length.

Other objects of the invention will, in part, be apparent, and will, in part, be obvious from the following description taken in conjunction with the accompanying drawings, in which:

Figure 1 is a view showing a fragment of a cross arm in section and an all sheet metal support pin embodying the invention, mounted in place on the cross arm;

Fig. 2 is a view of a flat sheet metal blank from which the support pin is made and depicting an initial stage in the method of making the pin;

Fig. 3 is a fragmentary view showing a development of the thimble in the upper end of the blank;

Fig. 4 is an edge view of the thimble end of the blank shown in Fig. 3;

Figs. 5 and 6 are end views, as seen looking at the shank end of the blank, and depicting the steps of shaping the blank first into U form in transverse section and then into final form which involves bringing the edges of the blank together;

Fig. 7 is an enlarged view in section of the thimble of the pin on which an insulator is threaded, the section being taken on the plane corresponding to lines VII—VII of Fig. 1;

Fig. 8 is a view of a portion of the shank part of a blank showing a modification of a detail having to do with the anchoring of a flange on the shank;

Fig. 9 is a view of a sheet metal blank similar to the one shown in Fig. 1, but which depicts a step in the formation of a modified form of thimble;

Fig. 10 is a partial section view, taken on line X—X of the blank shown in Fig. 9;

Fig. 11 is a view partly in section, of the upper end of a sheet metal pin made from the blank shown in Fig. 9, showing the modified form of thimble;

Fig. 12 is a view of a pin, made in accordance with this invention, and mounted in place on a cross arm, showing a modified form of shank which may be employed with any of the forms of pins shown in the drawings;

Figs. 13 and 14 are fragmentary plan and edge views respectively showing a section of the shank portion of a blank and the manner of making the modified shank shown in Fig. 12; and Fig. 15 is a fragmentary view of the lower or shank end of a blank showing a modified arrangement for securing a pin in the pinhole of a cross arm.

Throughout the drawings and the specification, like reference characters indicate like parts.

In Fig. 1 of the drawings, an all sheet metal insulator support pin 1 is shown mounted in position on a cross arm 2. The insulator pin comprises a shank 3 and a resilient yieldable thimble 4 which is unitary with the shank. As shown thimble 4 is tapered, being relatively small at the top but gradually becoming larger towards the bottom, and provided with threads 5 so that an insulator 6 having an internally threaded tapered cavity, may be screwed on the thimble, see Fig. 7.

As may be seen in Fig. 7, thimble 4 comprises a plurality of relatively narrow strips or ribbons 8 separated by slots or openings 9, which render the body of the thimble resilient and yieldably flexible, and causes the thimble to yield in response to pressure being exerted thereon by the threads of the insulator to avoid breaking the insulator when the same is screwed on.

To provide a smoothly operating thimble, each strip 8 may be transversely arched so that the edges thereof will be spaced from the threads of the insulator as indicated at 8' in Fig. 7. By so forming strips 8, the threads of an insulator when screwed on the thimble, will engage the middle portions of these strips.

As may be seen by inspection of Figs. 1, 5, 6, and 7, the diameter of the upper end of thimble 4 is approximately equal to the diameter of the shank, which means that the circumference of the upper end of the thimble is substantially equal to the width of the blank from which it was formed, while the diameter of the thimble at its largest point is materially greater than the diameter of the shank and therefore materially greater in circumference than the width of the blank. This enlargement of the tapered thimble is accomplished without drawing the metal and weakening the pin which would be the case if the thimble were formed by a drawing operation. So far as we are aware, no all sheet metal pin has been made heretofore of this character and particularly a pin which is made from a rectangular sheet metal blank and having a tapered thimble whose circumference at its greatest diameter is greater than the width of the blank from which it is made.

The shank of the pin is provided with a collar 10 having a flange 11 thereon which rests on the cross arm when the lower end of the shank is inserted through a hole 12 therein. Flange 11 may, if desired, be made square so that a wrench may be applied to it to prevent its turning when an insulator is screwed on the thimble. The lower end of the pin is provided with wings or fingers 13 which, after the pin has been driven home, are bent outwardly to engage the cross arm at the sides of the pinhole and lock the pin in place.

The method or procedure involved in the making of pin 1, includes the making of a blank, preferably rectangular in form, and of a length sufficient to make a full length pin. The sheet metal is of the same gauge throughout so that uniform strip material may be employed as the source of supply of blanks.

For convenience of description, the upper end of the blank shown in Fig. 2 will be called the thimble end and the portion below and extending to the bottom will be called the shank portion. Having provided a blank of the proper size, the thimble end of the blank may be subdivided into two or more strips 8 by the punching of at least one slot 9. The length of this slot should be at least equal to the length of the thimble or approximately so. In a preferred form, and for a given width of blank, a resilient and flexible thimble may be obtained by employing a plurality of equally spaced ribbons or strips 8 obtained by punching a plurality of spaced elongated slots 9, preferably equally spaced across the width of the blank. These slots may extend to the upper end of the blank or they may stop short of the upper end as shown in Fig. 2 so that these strips or ribbons will be united at their upper ends as well as at their lower ends. The lower end of the blank is punched to form the wings 13.

Having punched the blank as above described, the thimble is developed in the slotted portion of the blank. This includes the formation of the threads 5 which are pressed into the metal rather than being cut therein; the inward curving of the edges of the strips 8, to provide the clearance indicated at 8'; the bending up of the upper end of the blank to form a flange 15, and the pressing of the strips or ribbons 8 out of and at an angle to the plane of the blank so that when the pin is completed the thimble will have the taper shown in Fig. 4, while in the flat, and in Fig. 1 when in the round.

Having formed the development of the thimble and the retaining fingers 13 as depicted by Figs. 2, 3, and 4, the shank portion of the blank is upset in a die in such manner as to give it a U-shape in transverse section, see Fig. 5. When the shank portion is bent into a U-shape, the thimble portion of the blank is bent into a U-shape also as it takes the form or general form of the shank portion of the blank. The thimble and shank are completed by bending the shank into the form of a circle in transverse section. When the shank is finished the opposite edges of the upper end of the blank may be slightly separated as at 16, thus adding to the resiliency of the thimble. The pin, when completed, therefore has a tubular shank and a tapered thimble, i. e., the thimble is substantially of frusto-conical shape.

Having formed the thimble and the tubular shank, the collar 10 is pressed onto the shank and may be retained in place by spot welding. The collar may also be located on the shank by making depressions in the blank as at 17, see Fig. 8, from the inside face thereof, to form nubbins extending from the outer surface of the shank. Thus, when the collar is pressed onto the shank it comes to a stop at these nubbins. By employing nubbins, spot welding may be dispensed with, although such welding may be employed if desired.

Fig. 11 of the drawings illustrates the upper end of a modified form of thimble made substantially in accordance with the method of making the thimble shown and described in connection with Figs. 1 to 7, inclusive, but modified slightly to accommodate the modification in structure of said thimble. An insulator supporting pin having a modified thimble, such as shown in Fig. 11, is made from a flat sheet metal blank substantially rectangular in form, in the upper end of which a plurality of slots 18 are punched to form strips or ribbons 19. The slots terminate at such a distance from the upper end of the blank that the upper end thereof may be bent to form a return bend of substantially inverted U-shape in section as shown in Figs. 10 and 11. After punching these slots and bending the upper end as above described, the threaded tapered thimble is developed in the blank while the same is in the flat, as in the method employed in making thimble 1. At the lower end of the blank, portions are punched out to provide fingers 20 for securing the pin to a cross arm after the shank thereof has been inserted through a pinhole thereof.

In the development of the thimble, threads 21 are pressed into the strips 19 and, also, the strips are bent at an angle to the plane of the blank so that it will have the desired taper. The taper of the thimble is indicated in Fig. 10 (the blank being still in the flat) and in Fig. 11 where the thimble is in its completed form. By punching the slots and bending the upper end of the sheet metal blank as above mentioned, a flange 22 is provided which is substantially parallel to and in the same plane as the metal in the portion of the blank which forms the shank thereof. Therefore, when the shank is pressed first into U-shape, as depicted by Fig. 5, and then into circular form as depicted by Fig. 6, flange 22 is bent about an axis parallel thereto, into the form of a circle without subjecting it to any forces tending to tear the same. This flange further strengthens the upper end of the pin but does not stiffen the body of the thimble wherein resiliency is desired to insure that insulators when screwed on the thimble will not be subjected to such strains as might crack or otherwise break them.

The pin depicted by Fig. 11, while only partially shown, is of the same general form as pin 1 in regard to the shape of the thimble and the shank and, except for the steps depicted by Figs. 9 and 10, the method involved in the making thereof is the same as that employed in the making of pin 1 shown in Fig. 1 of the drawings. The strips of the thimble formed by the punching of slots 18 may be given a transverse curve throughout their lengths so that the edges thereof will be bent inwardly towards the longitudinal axis of the pin. This insures smooth working threads devoid of sharp edges which, if present, would catch or dig into the threads of the insulator and render the same rough working.

In Fig. 12 of the drawings an insulator pin is shown which may be made to the form depicted by Figs. 9 to 11, inclusive, or to the form depicted by Figs. 1 to 7, inclusive, with the exception of the structure of the shank. The shank of the pin shown in Fig. 12 is provided with an annular collar 24 which is pressed in the shank portion of the blank during the shaping of the blank while it is in the flat. This annular shoulder which is somewhat circular in section as shown by Fig. 14, rests on the top of the cross arm when the same is mounted in place and obviates the use of a separate collar such as collar 10, for example. A pin having a unitary collar 24 may be provided with fingers 25 at its lower end for anchoring the pin to cross arm 2 when the same has been inserted through the pinhole provided therein.

In Figs. 13 and 14 a fragment of the shank portion of the blank from which the forms of pins depicted by Figs. 11 and 1 may be made, are illustrated. The annular supporting collar 24 may be formed by pressing a transverse groove, preferably semi-circular in transverse section, in the sheet metal blank. This groove may be pressed in the blank at the same time that the thimble is developed in the blank while the same is in the flat. Therefore, when the shank of the thimble is shaped first to the form shown by Fig. 5 and then to the form depicted by Fig. 6, the shank will have an annular shoulder and this shoulder will rest on the top of the cross arm when the pin is driven home.

In some cases the user of pins such as shown and described herein will desire a pin which does not have the retaining fingers 13, 20 or 25 and instead, require that means be provided whereby small nails, such as shingle nails, may be driven into the cross arm and the pins to hold them in place. To facilitate the use of shingle nails for holding the pins in the cross arm, the blank from which any of the pins herein shown are made, may be provided with a series of holes 27 extending, for example, crosswise of the blank near its lower end, through which anchoring nails may be projected when driven into the cross arm. While these holes have been shown as extending in a straight line crosswise of the blank (see Fig. 15) it will be appreciated that they may be arranged in any manner most convenient to the linemen who place the pins on the cross arm.

While several forms of all sheet metal pins have been shown and described herein, all of these pins have in common the fact that the shanks are of relatively small diameter which means that smaller pinholes are required in the cross arms than in the case of the use of wood pins. Since smaller holes will accommodate these pins, cross arms of smaller cross-section may be employed than are required for wood pins. Furthermore, since these all sheet metal pins are stronger and are more able to resist the bending loads imposed by electrical distribution lines and by telephone lines, it is apparent that the poles may be spaced farther apart, thereby placing greater loads on the pins than could be carried by wood pins.

While the all sheet metal pins herein disclosed may be slightly higher in cost than all wood pins, still the fact that cross arms of smaller cross-section may be utilized and because of the fact that the spaces between poles may be increased beyond that which could be resorted to where wood pins are used, the difference in cost between the all sheet metal pins herein disclosed and wood pins is more than offset.

Having thus described the invention, what we claim as new and desire to secure by Letters Patent is:

1. A method of making sheet metal insulator support pins which consists in providing a flat rectangular blank; punching an elongated slot in one end of said blank that extends lengthwise of the same, thereby forming spaced ribbons which are unitary with the blank; forming threads in said ribbons; offsetting said ribbons in a direction substantially perpendicular to the plane of the blank and on a taper, which taper begins at the upper ends thereof and ends near the lower ends thereof; and then in shaping the portion of said blank below the ribboned portion into substantially tubular form to provide a shank and shaping the ribboned end into the form of a thimble on which an insulator may be screwed, the shank being insertable through a pinhole in a cross arm.

2. A method of manufacturing a metal support pin for insulators, such pin having unitary shank and thimble portions, which consists in providing a metal blank of substantially uniform gage from end to end and having a width substantially equal to the perimeter of the shank portion of such pin, severing the thimble forming portion of such blank to form a plurality of parallel strips extending longitudinally of the blank, located side by side and connected by the unsevered portion of the blank, forming thread-like ribs on each such strip which extend transversely across the same, distorting each such strip so as to offset the major portion thereof with relation to the plane of the wall of the shank portion of such blank, and shaping the unsevered portion of such blank to substantially cylindrical form so that the offset portions of said strips extend outwardly with relation to the exterior surface of such substantially cylindrical portion and converge toward the end of the pin remote from such substantially cylindrical portion.

3. A method of manufacturing a metal support pin for an insulator, such pin comprising a resiliently contractible threaded thimble portion tapered toward the outer end thereof and a unitary shank portion, which consists in providing a substantially rectangular metal blank of substantially uniform gage from end to end and of a width substantially equal to the perimeter of the shank portion of such pin, severing the thimble forming portion of said blank to form a plurality of substantially parallel strips extending substantially longitudinally of said blank and connected at both ends by the unsevered portions of the blank, forming thread-like corrugations across each such strip and distorting each such strip so as to offset the major portion thereof with relation to the shank forming portion of the blank and with the portions of each strip adjacent and farthest from the shank portion extending at an angle to each other, and then shaping the unsevered portion of such blank to substantially cylindrical form whereby the spacing between the intermediate portions of said strips is increased and said strips converge toward the end of the pin remote from the shank portion thereof.

4. A method of manufacturing a metal support pin for an insulator, such pin having a resilient, contractible, threaded thimble portion tapered toward the outer end thereof and a unitary tubular shank portion, which consists in providing a substantially flat sheet metal blank at substantially uniform gage from end to end of a width substantially equal to the perimeter of the shank portion of such pin, slotting the thimble portion of such blank to form ribbon-like strips extending longitudinally thereof and located side by side in parallel spaced relation with each other, offsetting each such strip throughout the major portion of its length and so that one portion thereof extends at an angle to the other portion thereof with both such portions merging into the plane of the shank portion of such blank, and then shaping the unslotted portions of the blank to tubular form and in thereby moving said strips out of parallel relation with each other and causing the offset portions thereof to project outwardly beyond the external surface of such portions of tubular form.

5. A method of manufacturing a metal support pin having a resiliently contractible threaded thimble portion and a substantially tubular unitary shank portion, which consists in providing a metal blank, of a length approximately equal to the length of such pin and of a width substantially equal to the perimeter of the shank portion of such pin, cutting the thimble forming portion of said blank to form substantially longitudinally extending ribbon-like strips located intermediate the ends of said blank and joined together at both ends by uncut portions of said blank, distorting each such strip so that an intermediate portion thereof is offset with relation to the plane of the shank portion of the blank, and then shaping the uncut portions of such blank to annular form and thereby increasing the spacing between the intermediate portions of said strips and causing the offset portions thereof to project outwardly with relation to the portion of annular form.

6. A method of manufacturing a metal support pin having a resiliently contractible, substantially conical thimble portion and a substantially cylindrical unitary shank portion, which consists in providing a substantially flat, rectangular blank of substantially uniform gage from end to end having a length approximately equal to the length of such pin and a width substantially equal to the perimeter of the shank portion of such pin, severing the thimble forming portion of the blank to form a plurality of strips of substantially equal width located side by side extending in substantially parallel relation longitudinally of the blank and connected together by the uncut portion of the blank, arching each such strip and distorting each such strip so that the major portion of its length is offset with relation to the plane of the shank forming portion of the blank and so that the portion at one end thereof extends at an angle to the portion at the other end thereof, and shaping the unsevered portion of said blank to tubular form, while moving such strips out of parallel relation with each other and so that the offset portions thereof project outwardly beyond the shank portion of the pin.

7. A method of manufacturing a metal support pin having a resiliently contractible, substantially conical thimble portion and a substantially cylindrical unitary shank portion, which consists in providing a flat metal blank of substantially uniform gage from end to end and having a length approximately equal to the length of the pin and a width substantially equal to the perimeter of the shank portion of the pin, severing the thimble forming portion of such blank to form a plurality of strips extending substantially longitudinally of such blank and connected together at both ends thereof by the unsevered portion of such blank, distorting each such strip to offset an intermediate portion thereof with relation to the plane of the shank portion of the blank, and then in shaping the unsevered portion of such blank to tubular form and moving said strips to substantially increase the spacing between the intermediate portions thereof.

8. A method of manufacturing a metal support pin having a substantially tubular shank portion and a unitary resilient thimble portion, which consists in providing a substantially rectangular metal blank of substantially uniform gage from end to end, severing the thimble forming portion thereof to form a plurality of substantially parallel strips located side by side and extending substantially longitudinally of the blank and secured together by the unsevered portion thereof, and distorting each such strip so that the major portion thereof is offset laterally with relation to the shank portion of such blank and so that the portion of each strip adjacent one end thereof extends at an angle to the portion of such strip adjacent the other end thereof.

9. A method of manufacturing a metal support pin having a tubular shank portion and a unitary resilient thimble portion, which consists in providing a rectangular, metal blank of substantially uniform gage from end to end, severing a portion of said blank to form a plurality of strips located side by side and extending in substantially parallel relation and secured together at both ends by the unsevered portion of said blank, forming a plurality of thread-like ridges across at least one face of each such strip and distorting each such strip so that the major portion thereof is offset with relation to the shank forming portion of the blank and so that the portion of each strip adjacent the shank portion of the blank extends at an angle to the remaining portion thereof.

10. A method of making sheet metal insulator support pins which consists in providing a flat substantially rectangular blank, punching an elongated slot in one end of the blank that extends longitudinally thereof and thereby forming spaced ribbon-like strips unitary with said blank, forming threads on said strips, deforming each such strip lengthwise thereof to arcuate shape in transverse section and offsetting the intermediate portion of each such strip beyond the plane of the wall of the unslotted portion of the blank, and then in shaping said blank so that the unslotted portion thereof is of tubular form and the offset portions of the strip project outwardly beyond the external surface of the portion of tubular form.

11. A method of manufacturing a metal support pin having unitary shank and thimble portions, which consists in providing a metal blank of substantially uniform gage from end to end and having a width substantially equal to the circumferential length of the shank portion of the pin, severing an intermediate portion of such blank to form a plurality of strips located side by side extending substantially longitudinally of the blank and connected together at both ends thereof by the unsevered portions of the blank, distorting each such strip to offset an intermediate portion thereof with relation to the plane of the unsevered portions of the blank, bending one such unsevered portion of the blank at an angle to said strips, and then in distorting both unsevered portions of such blank so that such bent portion is shaped to substantially annular form and the other unsevered portion thereof is shaped to tubular form and moving said strips to substantially increase the spacing between the intermediate portions thereof.

12. A method of making an insulator support pin having unitary tubular shank and thimble portions, which consists in providing a substantially rectangular sheet metal blank, punching at least one longitudinally extending slot in the thimble portion of such blank, forming a return bend in the outer end of the thimble portion of the blank at a point such that the slot extends into the bend and that the extremity of the portion of the blank so bent lies substantially parallel to the unslotted shank portion of the blank, offsetting the slotted portion of the blank from the shank portion thereof so that when the blank is shaped to tubular form the offset portions will have a larger diameter than the shank portion, and then in shaping the blank to tubular form.

13. An insulator support pin formed from a sheet metal blank and comprising a single piece tubular shank portion formed from an uncut portion of said blank bent to tubular form and a unitary tapered thimble portion formed from strips cut from said blank all unitarily connected together by said tubular shank portion and each deformed so that it extends outwardly beyond the external surface of said shank portion and then inwardly toward the projected axis of the same and each having thread-like ribs formed in the external surface thereof.

14. An insulator support pin formed from a sheet metal blank and comprising a tubular shank portion and a unitary cage-like thimble portion formed from strips cut from such blank, extending longitudinally thereof, connected together at both ends by uncut portions of the blank and each such strip deformed so that it extends outwardly, radially of said shank portion intermediate its ends.

15. An insulator support pin formed from a thin metal blank of substantially uniform gage from end to end and comprising a unitary structure including a tubular shank portion and a cage-like thimble portion formed from transversely corrugated, converging, diverging strips connected together at one end by said shank portion and at the other by a portion of said blank bent to tubular form.

16. An insulator support pin formed from a thin metal blank and comprising a unitary structure including a shank portion and a cage-like thimble formed of diverging, converging strips extending longitudinally of the pin and having thread-like ribs formed on the outer faces thereof and joined together at one end by said shank portion and at the other by an annular re-entrant flange.

17. A support pin as set forth by claim 16 characterized by the fact that the external faces of the strips are curved inwardly at their edges so that only the portions of the strips between their edges will be engaged by the threads of the insulator.

18. An insulator support pin formed from metal of substantially uniform gage from end to end, comprising a cage-like thimble and a unitary shank portion, said thimble being formed of diverging, converging strips formed as a unitary part of the pin and connected together at both ends thereof with each such strip offset, intermediate its ends, outwardly with relation to said shank portion.

19. An insulator support pin comprising a unitary shank portion and tapered thimble portion adapted to receive an insulator and characterized by the fact that the unitary structure is made from thin metal of substantially uniform gage from end to end, the circumference of the upper end of the thimble portion is at least equal to the circumference of the shank portion, the circumference of the thimble at an intermediate point along its length is materially greater than the circumference of the shank portion, and the thimble is sub-divided lengthwise into ribbon-like strips whose upper and lower ends are unitarily connected and the strips are deformed outwardly at an angle to the wall of the shank portion from the outer end of the thimble to the point of greatest diameter thereof from whence the strips converge and merge into the wall of the shank portion.

20. An insulator support pin comprising a unitary sheet metal shank portion and a tapered thimble portion characterized by the fact that the circumference of the thimble portion at an intermediate point along its length is materially greater than the circumference of the shank portion, and that the thimble portion is sub-divided lengthwise into strips whose upper and lower ends are unitarily connected, and that the strips are deformed to diverge outwardly at an angle to the wall of the shank portion, from the top of the thimble to the point of greatest diameter thereof, from which point the strips converge and merge into the wall of the shank portion, said strips being resiliently yieldable to pressure exerted thereon.

21. An insulator support pin comprising a unitary metal shank portion and a tapered thimble portion provided with threads, characterized by the fact that the circumference of the thimble portion at its point of greatest diameter is materially greater than the circumference of the shank portion, and that the thimble portion is sub-divided lengthwise into strips whose upper and lower ends are unitarily connected, and that the strips are deformed to diverge downwardly from the upper ends thereof to the point of greatest thimble diameter and to converge from such point and merge into the wall of the shank.

22. An insulator support pin such as set forth by claim 21, characterized by the fact that the edges of the strips are turned inwardly towards the longitudinal axis of the pin.

23. A metal support for insulators comprising a unitary shank portion and cage-like thimble, characterized by the fact that the thimble is formed from divergent, convergent strips secured together at one end by a unitary re-entrant flange and at the other end by said shank portion.

ANDREW A. HOCHER.
MARSHALL LASHER.